Feb. 15, 1949. R. G. LYNN 2,461,691
GRIPPER GAUGE
Filed March 6, 1946
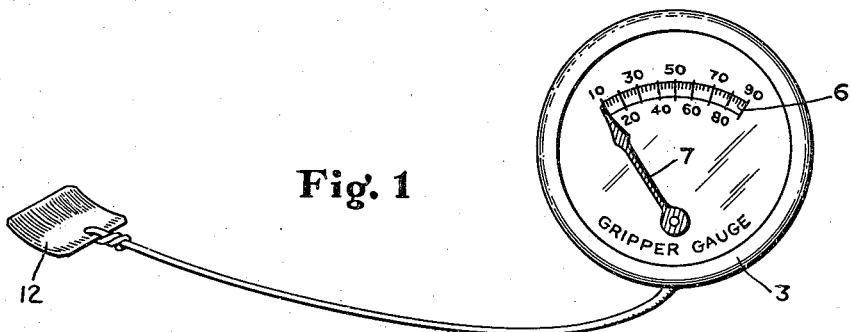
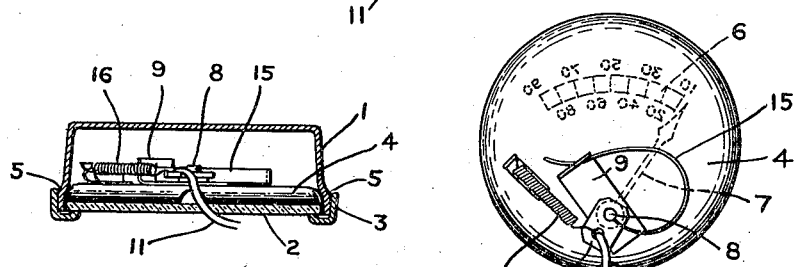
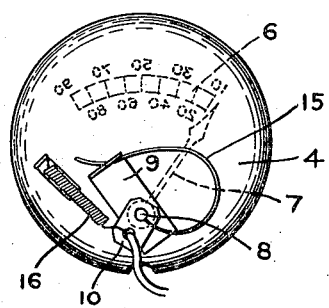
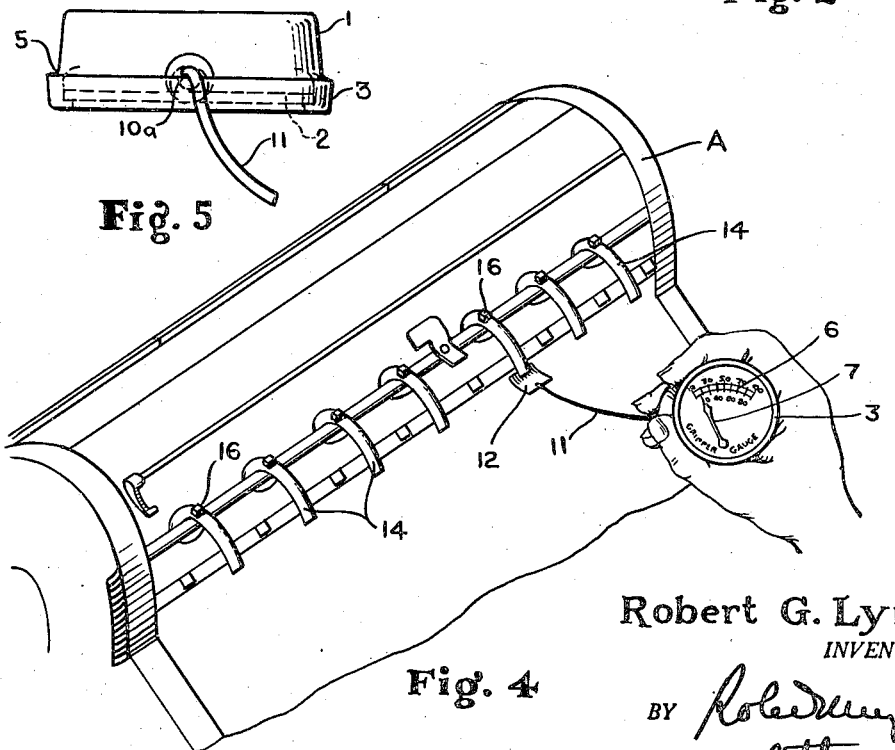
Robert G. Lynn
INVENTOR.

Patented Feb. 15, 1949

2,461,691

UNITED STATES PATENT OFFICE 2,461,691

GRIPPER GAUGE

Robert G. Lynn, Passaic, N. J.

Application March 6, 1946, Serial No. 652,417

2 Claims. (Cl. 73—141)

This invention relates to gauges and more particularly a gauge for use in setting the paper grippers on a cylinder printing press.

In running what are known as register jobs through printing presses where extreme accuracy is required in registering the matter to be imprinted on the paper or other material, the setting of the paper grippers is quite important so as to provide uniform gripping action throughout the width of the sheet of material passing through the press to insure accurate registering of the imprinted matter.

Heretofore it has been the practice to set the grippers depending upon the "feel" or "guess" of the person setting them, resulting quite often in uneven setting of the grippers with the result of uneven pressure on the material and considerable spoilage of the material through improper registering of the imprinted matter.

An object of the present invention is to provide a gauge whereby the grippers may be accurately and uniformly set to provide any predetermined pressure on the material depending upon the pressure required to provide most efficient operation upon the material being printed, with uniform pressure throughout the entire width of the sheet of material, and such a gauge which is simple in construction, easily operated and easily read so that it may be advantageously employed by a person unskilled in the use of gauges.

With these and other objects in view, as may appear from the accompanying specification, the invention consists of various features of construction and combination of parts, which will be first described in connection with the accompanying drawings, showing a gripper gauge of a preferred form embodying the invention, and the features forming the invention will be specifically pointed out in the claims.

In the drawings:

Figure 1 is a face view of the improved gauge.

Figure 2 is a plan view of the internal mechanism of the gauge.

Figure 3 is a section through the gauge casing showing the internal mechanism of the gauge in side elevation.

Figure 4 is a perspective view showing the manner of using the gauge.

Figure 5 is a side view of the gauge showing the opening in the housing.

Referring more particularly to the drawings the improved gauge includes a housing 1 having one side or its front open, a transparent cover 2 closes the open front of the housing 1 and is held in place by a removable binding ring 3.

A mechanism carrying plate 4 is located in the housing 1 and is held in place by the transparent cover 2 and the offset portion 5 of the rim of the housing 1. The carrying plate 4 has a scale 6 imprinted or etched on the front thereof which indicates degrees of pressure. A pointer 7 co-operates with the scale 6 and is mounted on a shaft 8 which is rotatably carried by a suitable bracket 9 attached to the back of the carrying plate 4.

A tensioning coil spring 16 has one end attached in any suitable manner to the carrying plate 4 and its other end is attached to a plate or member 10 which is in turn connected to the shaft 8. A flexible cord 11 is attached to the member or plate 10 and extends out of the housing 1 through a suitable opening 10a therein. The flexible cord, which is preferably soft wire has a contact or gripper tab 12 securely attached to its free end and this tab 12 is of thin sheet metal and is slightly curved transversely as clearly shown in Figures 1 and 4 of the drawings to cooperate with the gripper fingers 14 of a cylinder printing press a part of which is indicated at A in Figure 4.

If desired, a flat bowed steadying spring 15 has one end connected in any suitable manner to the bracket 9 and the other end attached to the shaft 8 as clearly shown in Figure 2 of the drawings. The steadying spring 15 provides a steadying resistance to the movement of the needle 7 and acts to maintain a slight tension on the tensioning coil 16 and thus maintain pointer 7 in a substantially fixed position near the lower end of the scale when the cord 11 is exerting no force thereon.

When setting the gripper fingers 14 of the printing press A to provide the proper and desired pressure on the material passing through the press, the set screws 16 are loosened and the gripper finger set with the tab 12 of the gauge under the material engaging end of the gripper finger. The set screw is then tightened and by pulling the tab 12 out from under the gripper finger the pressure exerted by the gripper finger will be indicated by the pointer 7 on the scale 6, thus an accurate determination of the pressure exerted by the gripper finger may be determined, and by using the gauge with all of the gripper fingers of the press all of them may be uniformly set to exert the same or a uniform pressure across the sheets of material passing through the press, thus preventing "cocking" or misplacement of parts of the sheet and insuring proper registration or placement of the matter being imprinted on the sheet.

It will be understood that the invention is not to be limited to the specific construction or arrangement of parts shown but is capable of other embodiments falling within the scope of the claims.

What is claimed is:

1. In a gauge having a housing, a circular scale, a carrying plate attached to the housing, a pointer rotatably carried by said plate and disposed to sweep the scale, an arm depending from the pointer, a spring connected to the arm and to the plate to yieldably bias the pointer in one direction, said housing provided with an opening suitably spaced from said arm, a cord passing through said opening and attached to said arm so that the tension thereon moves the pointer in the other direction, the edges of said opening providing a flexing point for said cord whereby the direction of pull of the cord on the arm is always the same, a pretensioning spring connected to said pointer and to said carrying plate to maintain said pointer at a substantially fixed point near the lower end of said scale when the cord is exerting no force thereon, said cord extending outside of the housing, and a tab attached to the cord outside of the housing whereby when the tab is inserted between engaging contact members and the gauge is moved from the members the tension in the cord will oppose the spring force and rotate the pointer to indicate on the scale the pressure between the engaging members.

2. In a gauge having a housing, a circular scale, a carrying plate attached to the housing, a pin rotatably mounted on said plate, a pointer connected to the pin for rotation therewith and disposed to sweep the scale, a lever arm connected to the pin to rotate said pin and pointer, said housing provided with an opening suitably spaced from said lever arm, a cord passing through said opening and attached to said arm, the edges of said opening providing a flexing point for said cord whereby the direction of pull of the cord is always the same, a spring connected to the housing and to the arm, a pretensioning spring connected to said pointer and said carrying plate, said springs and cord constructed and arranged to opposingly bias the pointer in opposite directions and to maintain said pointer at a substantially fixed point near the lower end of the scale when the cord is exerting no force thereon, said cord extending outside said housing, and a tab attached to the cord outside the housing whereby when the tab is inserted between engaging contact members the pressure between the members will create a tension on the cord when the gauge is moved away from said engaging members which will be transmitted to the pointer and read on the scale and thereafter returned to a zero set by the spring members when the pressure releases.

ROBERT G. LYNN.

REFERENCES CITED

The following references are of record in the file of this patent:

UNITED STATES PATENTS

| Number | Name | Date |
| --- | --- | --- |
| 290,840 | Blakeslee | Dec. 25, 1883 |
| 415,221 | Sands | Nov. 19, 1889 |
| 431,205 | Gilfillan | July 1, 1890 |
| 836,752 | Greg | Nov. 27, 1906 |
| 1,296,932 | Dodge | Mar. 11, 1919 |
| 2,013,938 | Williams | Sept. 10, 1935 |
| 2,077,510 | Boehler | Apr. 20, 1937 |